United States Patent Office 2,840,454
Patented June 24, 1958

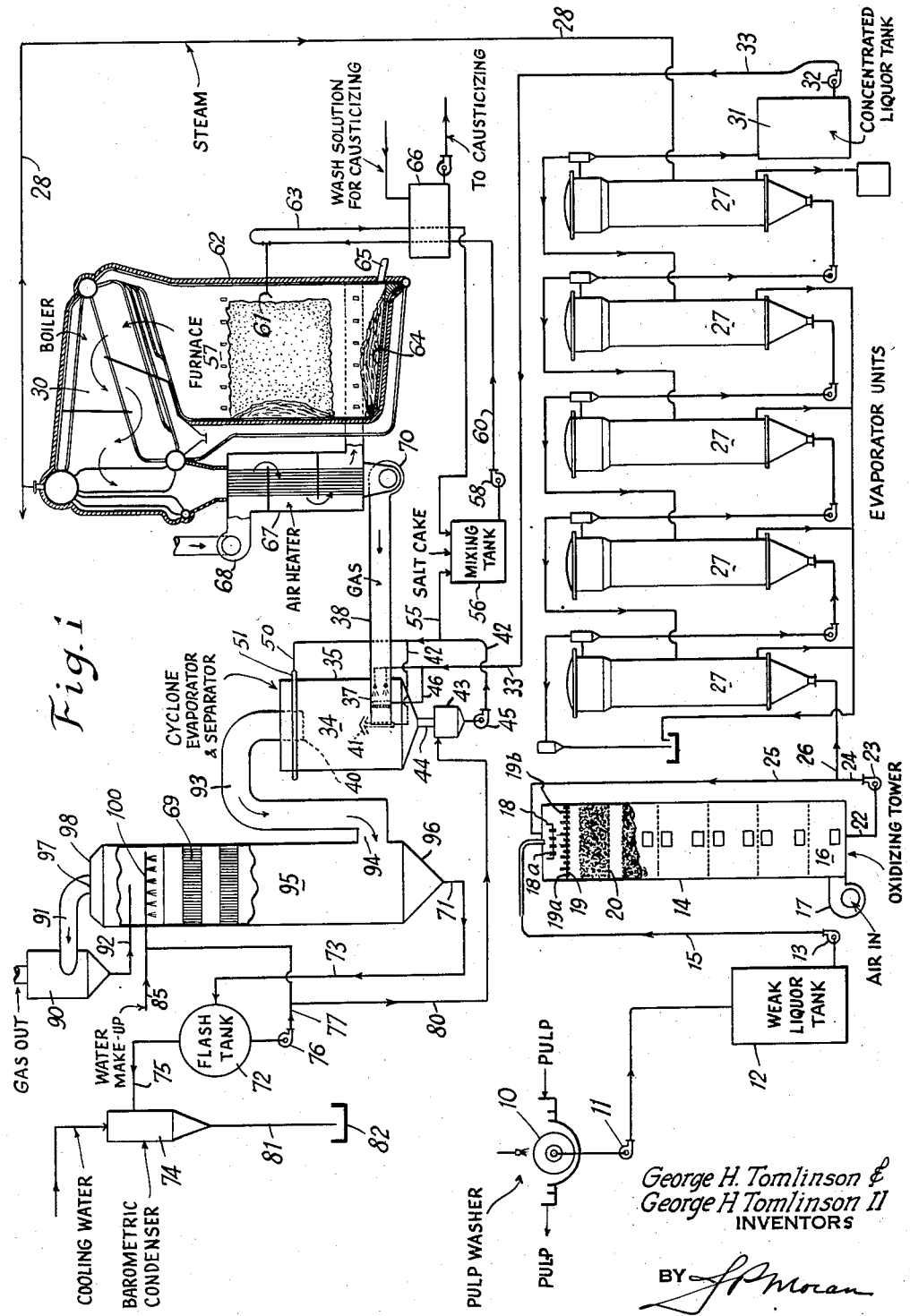

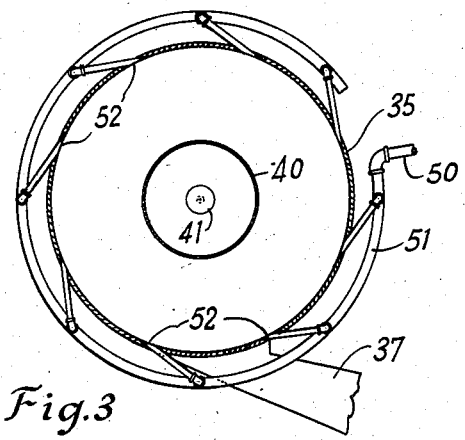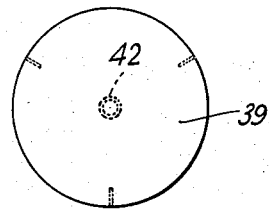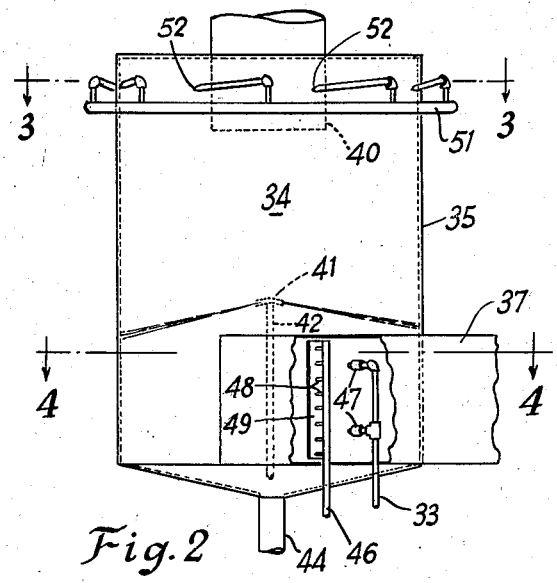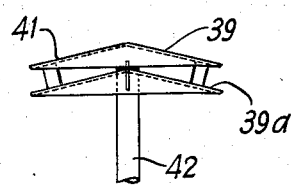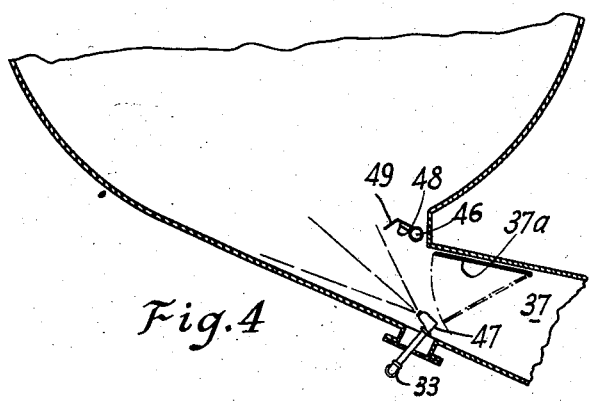

2,840,454

METHOD AND APPARATUS FOR RECOVERING HEAT AND CHEMICALS FROM THE RESIDUAL LIQUOR RESULTING FROM THE DIGESTION OF CELLULOSIC FIBROUS MATERIAL IN AN ALKALINE LIQUOR

George H. Tomlinson, Montreal, Quebec, and George H. Tomlinson II, Cornwall, Ontario, Canada, assignors to Howard Smith Paper Mills, Limited, Montreal, Quebec, Canada, a company of Canada Application January 10, 1946, Serial No. 640,360

14 Claims. (Cl. 23—48)

The present invention relates to a method of and apparatus for the recovery of chemicals and heat from the flue gases discharged from a chemical recovery unit in which pulp residual liquor is incinerated, resulting in both economic advantages and the elimination of serious industrial nuisances.

In the recovery of chemicals from a pulp residual process liquor containing inorganic chemicals and combustible organic matter, such as, for example, the "black liquor" of the sulphate process of manufacturing paper pulp, the liquor is concentrated by evaporation to a solid concentration of 45–70% and its combustible constituents burned in a furnace to recover the included inorganic chemicals and to generate heat for absorption in associated heat exchange apparatus. The heat absorptive surface installed in the unit is customarily limited by economic factors to a recovery of the relatively high temperature potential heat in the combustion gases. As a result the temperature of the flue gases leaving the usual sulphate process chemical and heat recovery unit will be in the range of 400°–600° F. The gases thus contain a substantial amount of low temperature potential heat. In order to utilize a portion of this heat in the flue gases in concentrating the residual liquor prior to its incineration, the gases are usually subjected to direct contact with the liquor either in a spray tower or a disc evaporator. Although the thermal efficiency of the recovery process is substantially improved by such direct contact of hot flue gases with residual liquor, the heat recovery process has heretofore been limited to a reduction in flue gas temperature to a minimum of approximately 250° F. The total heat content of the gases leaving the direct contact liquor evaporator is essentially unchanged from that of their entering condition on account of their increased water vapor content, since sensible heat has been converted to latent heat, and none of this heat in the gases leaving the liquor evaporator, representing as it does about 35% of the heat generated in the furnace, is normally recovered. If the attempt is made to recover this heat, involving as it does cooling of the gases to a temperature essentially lower that 250° F., serious corrosion rapidly takes place in the metallic parts of the subsequent apparatus due to the presence of moisture and the content of sulphur-containing compounds in the gases, namely sulphur dioxide ($SO_2$), sulphur trioxide ($SO_3$), and hydrogen sulphide ($H_2S$). The presence of these corrosive sulphur constituents in the gases also represents an undesirable loss of sulphur from the cyclic recovery process.

Since the black liquor is strongly alkaline, it might appear that in the system heretofore used, the $SO_2$ and $SO_3$ could be readily absorbed by effecting a more intimate direct contact between the residual liquor and the hot flue gases by increasing the amount of liquor recirculated and the use of finer sprays. However, if this should be done with the conventional black liquor and in the equipment heretofore used, we have discovered that at least three serious disadvantages would result.

An excessive carry-over of black liquor spray droplets would occur which, upon contact with a surface away from the normal liquor stream, would carbonate with the formation of an insoluble lignin deposit. This deposit would dry out and any excessive temperature in this zone would carbonize this deposit with a resultant plugging of the equipment and the connecting ducts, necessitating frequent shut down of the equipment for the removal of such deposits. Spray particles that were not deposited on the walls of the equipment and which escaped to the atmosphere in the flue gas stream would not only represent a substantial chemical loss to the system but would also create a serious industrial nuisance.

The sulphate black liquor normally used in direct contact liquor evaporators, in addition to sodium hydroxide (NaOH), sodium carbonate ($Na_2CO_3$) etc., contains considerable quantities of sodium sulphide ($Na_2S$). Sodium sulphide, being the salt of a weak acid, tends to hydrolyze in aqueous solution. When such a solution is evaporated $H_2S$ tends to escape from the solution in the form of a gas even in the presence of excess NaOH, the reversible reaction being as follows:

(1) 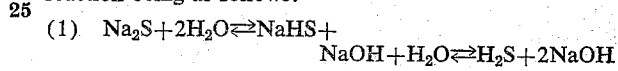

In addition to such loss due to evaporation, carbon dioxide ($CO_2$) present in the flue gases, being more strongly acidic than $H_2S$, will react with $Na_2S$ to release additional $H_2S$, this reaction being:

(2) 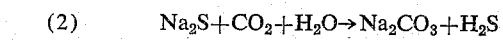

Reaction (2) proceeds to a markedly increased extent as the liquor-gas contact conditions are improved. Thus in attempting to recover the sulphur in the form of $SO_2$ and $SO_3$ from the flue gases, and to obtain increased thermal recovery from the gases, increasing quantities of $H_2S$ would be lost with resulting odor problems and loss of sulphur from the system.

In addition to $Na_2S$, the residual liquor also contains small quantities of methyl mercaptan ($CH_3SH$), present as its sodium salt ($CH_3SNa$). This salt reacts with water and $CO_2$ in an analogous manner to $Na_2S$ with the exception that $CH_3SH$ is liberated rather than $H_2S$. Both gases have a particularly offensive odor, which creates an industrial nuisance. Such sulphur losses in the evaporating apparatus are not economically recoverable at the present time.

The conditions most favorable for absorption of $SO_2$ and $SO_3$, namely, a large liquid-gas interface, also favor the conversion of sensible heat to latent heat, so that in any attempt to accomplish the former result, the gases would be simultaneously cooled down until their vapor pressure was equal to that of the liquor, this being at a temperature of approximately 180–190° F. At such temperatures, which are very close to the dew point of the gases, extremely rapid corrosion of the metallic parts of subsequent apparatus would occur as a result of only trace quantities of sulphur oxide constituents in the gases, particularly in the presence of $H_2S$.

We have found that the problem of black liquor entrainment in the gases leaving the direct contact liquor evaporator can be solved by passing these gases through a cyclonic separating zone, which may be subsequent to the direct contact liquor evaporating zone or preferably, combined therewith in a common cyclone vessel, into which a stream of flue gases is tangentially introduced and the gases, laden with liquor to be evaporated mixed therewith during or immediately subsequent to their introduction, are passed upwardly at a relatively high velocity through a helical path in intimate scrubbing contact with boundary walls continuously wetted with previously treated liquor to form a descending liquor film over the boundary walls. The centrifugal effect of the rotating gas stream in contact with the wetted wall surface is prolonged for a period sufficient for all of the entrained liquor particles to be deposited on the boundary walls before the gases are discharged from the separating zone. During the period of suspension in the gases and while in the descending liquor film, the intimate contact between the liquor particles and the surrounding or contacting hot gases causes the evaporation of a portion of their water content. This evaporating effect is substantially increased, while limiting the axial length of the evaporating and separating zone, by recycling the partly dehydrated liquor until a predetermined concentration is effected, at which concentration it is withdrawn. Advantageously, the liquor is continuously drained from the evaporating and separating zone to avoid the formation of a liquor pool in the bottom thereof.

The described evaporating effect is limited with the conventional sulphate black liquor by the necessity of avoiding a reduction in gas temperature below approximately 250° F., since excessive corrosion of subsequent equipment will occur with lower gas temperatures due to the presence of $Na_2S$ in the liquor. It would therefore be necessary when operating with such a liquor, to use relatively coarse liquor sprays and to recycle the liquor only to a sufficient extent to cool the gases to this temperature. The maximum efficiency of the operation is unattainable under such conditions.

We have found that the unstable sodium sulphide and the sodium salt of methyl mercaptan in the black liquor can be converted to reusable stable sodium-sulphur compounds which will not release hydrogen sulphide during subsequent evaporation or carbonation of the liquor by oxidizing the liquor under predetermined conditions suitable for a continuous industrial process. Our experiments have indicated that the reaction involved in the oxidation of sodium sulphide in sulphate black liquor involves the conversion of the sodium sulphide to thiosulphate, a more stable form for the sulphur, and to sodium hydroxide, and that oxidation with air can be readily and completely effected at a rapid rate, if predetermined pressure and temperature conditions are maintained. For example, we have found that optimum oxidizing conditions at atmospheric pressure require a temperature in the range of 140°–180° F. and preferably at approximately 160° F. The oxygen absorption rate of this liquor tends to increase with increasing temperature, but at temperatures between about 160° F. and 180° F. the solubility of the oxygen of the air in the liquor and the lower partial pressure of the oxygen in the gas phase will tend to reduce the net oxygen absorption rate of the sulphate liquor. This tendency of reduced net oxygen absorption rate may be effectively offset by the use of higher air pressure in the oxidizing apparatus.

We have also found that the oxidation rate of sodium sulphide is substantially increased by the presence of the sulphate process lignin, which appears to have a catalytic action. This catalytic property does not appear to be present in alkaline treated waste sulphite liquor. While various types of apparatus may be used for the oxidation operation, it is desirable to minimize the exposure of the lignin to oxidizing conditions where lignin recovery is contemplated.

In some alkaline processes, such as the soda process as normally practiced, the amount of sodium sulphide in the cooking liquor is sufficiently small that it is all converted to a stabilized form during the digestion process and it is therefore unnecessary to carry out the described oxidation operation as a separate step.

By stabilizing the liquor prior to evaporation in the multiple effect evaporator, we have found that sulphur losses in the evaporator units are substantially reduced. The partly concentrated oxidized liquor can then be subjected to the cyclonic evaporating and separating operation described, which can then be operated at its maximum thermal efficiency and the liquor withdrawn therefrom at a concentration suitable for incineration under self-sustaining combustion conditions. The final evaporation of the liquor is accomplished in the furnace of the recovery unit. With the conventional sulphate black liquor, considerable quantities of $H_2S$ are liberated in the furnace in accordance with reactions (1) and (2) supra. This $H_2S$ is burned to $SO_2$ in the furnace and a substantial part of the $SO_2$ further oxidized to $SO_3$, particularly in the boiler tube zone where the temperature favors the conversion of $SO_2$ to $SO_3$. However when an oxidized liquor is incinerated, a greater proportion of the sulphur in the liquor will remain combined with the sodium during its incineration, reaching the furnace hearth where it is reduced by the carbon in the char bed to $Na_2S$, which is carried from the furnace in the smelt. Thus with oxidized black liquor, the flue gases will contain a lesser amount of gaseous sulphur oxides and such amount as may be present can be effectively recovered in direct contact with the liquor as described, without the formation of $H_2S$.

The flue gases leaving the cyclonic evaporating and separating zone, having been effectively freed of their corrosive sulphur-containing gaseous constituents and their temperature substantially reduced, are now in a favorable condition for the recovery of sodium sulphate ($Na_2SO_4$) and the recovery of a substantial portion of their low potential heat content. The $Na_2SO_4$ exists in the flue gases from a sulphate liquor recovery furnace to a small extent as a coagulated dust swept from deposits on the boiler heating surface and to a much greater extent as a widely dispersed fume with the fume particles of sub-micron dimensions, resulting from volatilization of the sodium salts in the furnace. The removal of this fume from the flue gases is highly desirable, not only for the substantial value of the chemical, but also since it forms a considerable industrial nuisance when discharged from the stack. It has been found that the fume can be partly recovered by costly electrical precipitation apparatus, but due to the corrosive nature of the gases from the incineration of the conventional sulphate black liquor, it has been necessary to maintain gas temperatures over 250° F. in a dry type precipitator to allow removal of the collected sodium sulphate in a dry condition. Flushing type precipitators are impracticable under such corrosive conditions. Other methods of dry fume separation, such as by sedimentation by cyclonic action and by filtration through gas filters, have proved commercially impractical due to the small size of such fume particles.

It is known that fume particles can be theoretically recovered from a gas by passing the fume-laden gas through a chamber into which a low temperature cooling liquid is sprayed. As a practical matter, however, the quantity of sprayed liquid required to condense the water vapor content of the gas and thus bring down the fume particles with a widely dispersed fume such as the sodium sulphate fume herein, and the gas temperature level at which this must take place, would be such that the collected fume solution would be so dilute as to be of negligible commercial value and unless the gas is free of sulphur-containing gaseous constituents corrosion would occur in the apparatus at uneconomic rates.

The flue gases leaving the cyclonic evaporation and separating zone as described are free of their gaseous sulphur constituents. Due to the conversion of sensible heat to latent heat in this operation and the increased water vapor content of the flue gases leaving the cyclonic zone, the total heat content of the flue gases is substantially unchanged while passing through this zone. A large amount of low potential heat is thus available in these flue gases. Pulp mills can advantageously use large quantities of warm water, provided the water is not contaminated with corrosive sulphur constituents, such as H$_2$S.

In accordance with our invention, substantially all of the sodium sulphate fume particles and a substantial portion of the low potential heat content of the flue gases leaving the cyclonic zone can be recovered by passing the flue gases upwardly in direct and intimate countercurrent contact with a lower temperature cooling liquid. This intimate liquid-gas contact is maintained for a period sufficient to reduce the flue gas temperature substantially below the initial point, causing a major portion of the water vapor therein to condense and the cooling liquid to absorb the latent heat of evaporation of the condensing vapor. The condensing moisture forms droplets about nuclei of suspended fume particles, so that the entrained fume particles are carried downwardly with the condensed moisture and cooling liquid and collected at the bottom of the fume and heat recovery zone, while the flue gases at a low temperature and substantially freed of suspended moisture and fume particles, pass to the stack. The collected chemicals are advantageously concentrated to a predetermined concentration suitable for addition to the concentrated black liquor in the cyclonic evaporating and separating zone by flash evaporating the fume solution and recycling the major portion of the cooled evaporated solution through the fume and heat recovery zone and the flash evaporator. The heat values in the flashed vapor are completely recovered in cooling water supplied to a barometric condenser associated with the flash chamber. In this way, a large amount of warm water (approx. 100° F.) uncontaminated by H$_2$S or other chemicals in the process will be available for use.

The main object of our invention is the provision of an improved method of and apparatus for recovering heat and chemicals from hot flue gases discharged from a chemical recovery unit in which pulp residual liquor is incinerated. A further and more specific object is the provision of an improved cyclic recovery system of the character described having a high thermal efficiency and low chemical losses, and particularly characterized by an increased degree of liquor concentration in direct contact liquor evaporating apparatus without the release of noxious gaseous sulphur constituents therein or the inclusion of sulphur oxides or residual liquor in the discharging flue gases, the recovery of substantially all of the sodium sulphate fume in the flue gases, and the production of large quantities of warm water uncontaminated by corrosive chemical constituents of the residual liquor. A further object is the provision of a cyclic recovery system of the character described in which the concentrated residual liquor delivered to the recovery furnace has its sulphur constituents in a more stable condition whereby the sodium-sulphur content of the smelt is increased. A further specific object is the provision of a cyclic recovery system of the character described having highly efficient heat and chemical recovery apparatus of simple and low cost construction and operation, low space requirements, ease of operation, and freedom from the necessity of frequent cleaning.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 1 is a schematic diagram of the flow sequence of a chemical and heat recovery system for sulphate pulp residual liquor incorporating the present invention;

Fig. 2 is an enlarged elevation of the gas scrubber and recirculating tank;

Fig. 3 is a horizontal section on the line 3—3 of Fig. 2;

Fig. 4 is a fragmentary horizontal section on the line 4—4 of Fig. 2;

Fig. 5 is an elevation of one of the spraying devices; and

Fig. 6 is a plan view of the construction shown in Fig. 5.

As indicated in the flow diagram, Fig. 1, the apparatus for carrying out the described cyclic recovery process, comprises digesters and a blow pit (not shown) from which pulp is passed to one or more pulp washers 10 where it is washed with hot water (150°–160° F.) to remove residual chemicals and organic solids. From the washers, the pulp is transferred to treating and drying units (not shown) for processing into paper, while the residual or "black" liquor is withdrawn from the washers by a pump 11 and delivered to a weak liquor storage tank 12.

The weak liquor in the tank 12 has a solid concentration of 15–18% and is normally at a temperature approximately 160° F., which is especially suitable for oxidization of the unstable sulphur compounds in the liquor under atmospheric pressure conditions. The oxidation operation is advantageously carried out at this point, prior to any evaporation of the liquor, and due to the rapid oxidation of the sodium sulphide because of the catalytic properties of the lignin present in the liquor, it can be carried out in apparatus permitting a continuous relatively rapid flow of the liquor and air therethrough, such as a tower 14 packed with material having a high ratio of surface area to volume, such as Raschig rings, coke or the like.

As shown in Fig. 1, the oxidizing tower 14 receives weak liquor from the tank 12 through a pump 13 and supply pipe 15. An air inlet chamber 16 in the bottom of the tower receives a continuous supply of air from a forced draft fan 17. A central distribution trough 18 is positioned on the top of the tower to receive the liquor from the supply pipe 15 and continuously discharge it through overflow nozzles 18$^a$ therein onto a secondary distributing plate 19 having uniformly distributed overflow nozzles 19$^a$ through which the liquor flows onto the subjacent upper surface of the packing material. Pipes 19$^b$ in the plate 19 extend above the liquor level on the plate to permit the discharge of the air, the top of the tower being open or otherwise suitably ventilated. The packing may be a continuous charge or be carried on vertically spaced gratings 20 to the levels indicated in Fig. 1, providing an extensive wetting surface area for the liquor and a corresponding surface contact between the liquor trickling down through the tower packing and the ascending streams of air. Complete oxidation of the unstable sodium sulphur compounds in the liquor is normally effected during its passage. The tower has a liquor outlet pipe 22 at its lower end for the discharge of the oxidized liquor.

A pump 23 receives liquor from the outlet pipe 22 at a predetermined rate and discharges it into a pipe 24 having branch pipes 25 and 26 leading respectively to the primary distributing plate 18 at the top of the tower 14 and to the first effect of a multiple effect evaporator 27. The described piping arrangement permits a regulable portion of the liquor to be recirculated through the branch 25 and tower 14 for further exposure to the oxidizing effect of the air passing therethrough when the liquor being discharged is found to be insufficiently oxidized.

The evaporator effects 27 are arranged to concentrate the normally completely oxidized weak liquor delivered thereto, by the evaporation of moisture in a well known manner. Saturated steam used in the evaporator effects is supplied from the recovery unit boiler 30 through a connecting steam main 28. The liquor is concentrated in the evaporator to a solid concentration of 35–40% and delivered to a concentrated liquor storage tank 31, from which it is withdrawn as required by a pump 32 and delivered through a pipe 33 to a direct contact liquor and gas contact apparatus 34 for a further and substantial concentration of the liquor, the recovery of chemicals from the hot flue gases from the recovery unit, and the separation of the residual liquor entrained in the flue gases before leaving the apparatus.

In accordance with our invention, and as shown in Figs. 2-6, the evaporating and separating apparatus or gas scrubber 34 consists of a generally cylindrical body 35 provided with an inverted conical bottom and a tangential inlet 37 in the lower portion of the cylindrical body 35. Flue gases, resulting from the combustion of a residual liquor of a predetermined solid concentration in the recovery furnace as hereinafter described, pass through a duct 38 under a positive pressure to enter the gas scrubber 34 at a relatively high velocity through the inwardly tapering tangential inlet 37, thence flowing upwardly in a helical path along the chamber wall. An externally operable baffle 37ª controls the effective flow area of the inlet 37, and thereby the entering gas velocity, and is hinged at its outer end to the inner side of the duct to maintain a tangential gas entry at all times. A flue gas outlet from the scrubber chamber is formed by a vertical duct 40 centrally arranged in the top of the chamber and having its open lower end at a level substantially below the top of the chamber, so that a complete change in direction of flow of the gase stream is effected in the annular space surrounding the duct 40 before the gases exit from the chamber.

If the hot flue gases were to flow through the gas scrubber 34 at the same temperature (400-600° F.) as the gases leave the air heater, the gas temperature within the scrubber would be too high for the optimum conditions for sulphur oxide absorption. Moreover such high gas temperatures would tend to cause liquor to dry out and carbonize on any spraying devices in the scrubber chamber. In accordance with the invention, optimum temperature conditions for sulphur oxide absorption and protection of such nozzles from liquor carbonization are obtained by rapidly and substantially reducing the temperature of the entering flue gases. The provisions for this purpose include a plurality of vertically spaced spray nozzles 47 extending into the inlet duct 37 and arranged to discharge relatively coarse conical sprays of concentrated residual liquor from the pipe 33 towards and across the gas entrance area of the duct 37 into the scrubber chamber, as indicated in Fig. 4. A second series of vertically spaced spray nozzles 48 at the opposite side of the duct 37 receives another portion of this liquor through a branch pipe 46 and by means of one or more associated nozzle impact plates 49 discharges a substantially continuous sheet or curtain of the liquor across the entrance area of the duct 37. With the described arrangement of liquor nozzles, the flow of residual liquor to the nozzles 47 and 48 can be readily regulated to secure the desired reduction in temperature of the liquor-laden flue gases entering the gas scrubber 34, e. g. a scrubber gas temperature approaching 200° F.

A spraying device 41 is positioned axially of the lower part of the scrubber chamber superjacent the flue gas inlet 37 and arranged to receive a mixture of oxidized residual liquor, which has been previously sprayed into the gas scrubber, and a recovered fume solution, from a recirculation tank 43 through a pump 45 and a pipe 42 connected thereto. The tank 43 is connected to the bottom of the scrubber chamber by a drain pipe 44, so that liquor running down the walls of the scrubber chamber will collect in the tank without forming a pool in the bottom of the chamber. The spraying device 41 illustrated in Figs. 5 and 6 consists of a vertical discharge section of the pipe 42 on the upper end of which a pair of vertically spaced shallow conical plates 39 and 39ª are mounted, the discharging liquor impacting on the center section of the plate 39 and discharging as a relatively coarse spray over the entire circumference of the plate. The plates are so shaped that the spray discharges at a slightly downward angle across the path of the whirling ascending gas stream. The sprays from the spray devices 47, 48 and 41 are further subdivided by the whirling gases and an intimate mixture of the spray particles and gases in the chamber results, providing a large heat transfer contact area therebetween sufficient to effect the desired evaporation affect on the sprayed liquor. The gaseous sulphur oxides in the flue gases are simultaneously absorbed by the stabilized alkaline liquor sprays, so that the recovered sulphur can recombine with the liquor increasing the total sulphur content of the liquor. If the nozzles 47 should be of sufficient capacity to handle all of the partly concentrated liquor from the tank 31, the spray nozzles 48 can advantageously be connected to the pipe 42 to receive recirculated liquor.

The intimate contact of the sprayed liquor with the entering flue gases thus not only substantially reduces the gas temperature and concentrates the liquor by the evaporation of included moisture, but also washes out as precipitate the entrained coagulated sodium sulphate dust in those gases. The cyclonic action and flow path of the liquor-laden gas stream in the gas scrubber tends to effect the substantially complete separation of the coagulated dust particles and sprayed liquor droplets from the flue gases and deposition on the chamber walls before the gases leave the scrubber. The gaseous sulphur oxides in the flue gases will be substantially completely absorbed in the scrubber by the sprayed liquor under these temperature and liquor-gas contact conditions.

The solid and liquor particles depositing on the scrubber chamber walls are continuously removed by maintaining a continuous film or sheet of recycled liquor downwardly over these surfaces. For this purpose, another portion of recycled liquor is delivered through a pipe 50 to a horizontally disposed annular header 51 exteriorly surrounding the upper portion of the scrubber. A series of tangentially arranged liquor spray nozzles 52 are symmetrically spaced circumferentially around the inside wall of the scrubber intermediate the top of the chamber and the lower end of the duct 40. Each spray nozzle is connected with the header 51 and arranged to discharge liquor downwardly at a slight angle to the horizontal sweeping the inside vertical wall of the scrubber 34. The sprays are directed in the same angular direction as the ascending stream of liquor laden gas, forming a descending film of liquor swept by the ascending gas stream. The descending liquor washes the interior wall surface of the scrubber and removes any solids that may deposit thereon. The resulting wet surface of the scrubber wall aids in the separation of liquor and solid particles from the whirling gas stream in the chamber. Separation of any remaining particles occurs on the change in direction of the gases in the annular space surrounding the duct 40. With the described scrubber construction and operation, mechanical carryover of black liquor in the gases was found to be eliminated. There was no evidence that any carbonization of the black liquor had occurred, and at the same time carbonation was insufficient to cause lignin precipitation. The temperature of the gases leaving the scrubber was readily maintained at its equilibrium value, usually 180-190° F., by adjusting the volume of recirculated liquor. A substantial concentration of the liquor was effected, the solid concentration of the liquor leaving the multiple effect evaporator at about 35-40% being raised to about 55%, for example.

The tank 43 is preferably constructed of a suitably large size so that rapid changes in the Baume of the liquor collected therein are not likely to occur. Since this pool of collected liquor is located below the lower portion of the scrubber 34 and in communication therewith only through a relatively small diameter connection any failure of liquor supply, such as by reason of a power failure, will not result in a drying or charring of any large quantity of liquor by exposure to the heat of the entering flue gases.

A valved branch 55 of the pipe 42 directs the flow of a predetermined quantity of liquor to a mixing tank 56 wherein salt cake may be added, if desired, to the liquor preparatory to the use of the liquor as a fuel in a recovery furnace 57 of the general type shown in U. S. Patent 2,161,110. The liquor is withdrawn from the tank 56 by a pump 58 and delivered through a feed pipe 60 to an oscillatable liquor spray nozzle 61 situated in a wall 62 of the furnace 57. Preferably, the pipe 60 is provided with an extension 63 beyond the spray nozzle take off and located so as to return excess liquor to the mixing tank 56. By continuously circulating excess liquor, the pipes 60 and 63 will be kept clean.

The spray nozzle 61 is simultaneously oscillated in two planes of movement so as to deposit successive films of liquor upon the side and rear walls of the furnace 57. As the liquor deposit builds up in successive layers upon the walls, it is dried by the heat of the furnace and the char so formed will break off in lumps due to the effect of gravity thereon. These lumps fall onto a sloping hearth 64 at the bottom of the furnace 57 where the combustible matter is burned off by the introduction of preheated air streams. The residue of the char largely consists of inorganic chemicals which are converted to a liquid or semi-liquid smelt containing sodium carbonate and sulphide. The smelt flows through a spout 65 at the lower end of the hearth 64 and is deposited in a tank 66 wherein it is dissolved by a wash solution for causticizing, thereafter being pumped to the causticizing portion of the process (not shown) for treatment and subsequent reuse in the pulp digesters, the digestion reagents being sodium hydroxide and sodium sulphide. In accordance with our present invention, soda ash may be added to the green liquor or caustic to the white liquor as a portion of the make-up chemical.

The high grade heat generated by the combustion of the liquor is absorbed from the gases of combustion by a series of heat absorptive surfaces, such as the tubes of the boiler 30 shown in Fig. 1. The cooled gases leaving the boiler are passed through a tubular air heater 67 wherein air, delivered by the forced draft fan 68, is heated in its passage through the heater 67 and passed to various sets of air ports in the furnace for use as combustion air. The flue gases drawn through the heater 67 are delivered to the duct 38 by the induced draft fan 70. The flue gases, with entrained solids and gaseous chemicals then pass to the scrubber 34 as previously described.

The flue gases leaving the outlet duct 40 of the scrubber 34 are passed through a duct 93 to a gas inlet 94 in the lower portion of a condensing tower 95 for condensing water vapor from the gases and thereby separating substantially all of the fume particles remaining in suspension in the gases. The tower 95 as shown is of cylindrical shape and is provided with an inverted conical bottom section 96 and a gas outlet 97 in its top cover plate 98. A horizontally disposed series of distributing liquid inlets 100 are located in the upper portion of the tower at a spaced position below the gas outlet 97 and are arranged to direct a cooling liquid downwardly counter-current to the ascending flue gases. As shown in Fig. 1 the bottom portion 96 of the tower is provided with an outlet 71 which is connected with a vacuum or flash tank 72 by a pipe 73. Preferably the tower 95 is packed to provide a large surface contact between the liquid and the gases passing therethrough. A suitable type of packing is shown for example in Fig. 1, which not only provides a large surface of contact but also offers a minimum of resistance to the flow of gases. As shown, the packing includes a series of horizontally spaced, substantially vertical wooden plates 69 extending across the interior of the tower. A similar series of wooden plates is positioned below the upper adjacent series with the horizontal axes of the lower plates normal to those of the upper plates. The separate series of wooden plates are placed in a tier, one upon the other, with the plates of each series normal to those in the series immediately below and extending from an upper level spaced beneath the liquid inlets, substantially as shown, to a lower level immediately above the gas inlet 94.

The flue gases passing through the tower 95 are cooled to a temperature of approximately 110° F. to 120° F. by the use of an adequate quantity of recirculated cooling liquid supplied at a lower temperature in intimate contact and counter-current relation with the ascending gases. Under these conditions the greater part of the water vapor entering the tower in the flue gases will be condensed. The condensing moisture and cooling liquid form droplets about nuclei of suspended fume particles so that a high percentage (90–98%) of the sodium sulphate fume present will be recovered from the gases, collecting in the tower section 96.

Much of the heat content of the fume solution is recovered and the fume solution suitably concentrated by passing the solution to the flash tank 72. The flash tank 72 is maintained at a subatmospheric pressure by a barometric condenser 74 which is connected therewith by a pipe 75. Thus the fume solution accumulating in the conical section 96 of the tower 95 is continuously withdrawn therefrom and delivered to the flash tank 72 where a portion of the liquid is evaporated and the vapor drawn to the barometric condenser, while the unevaporated liquid solution, cooled and concentrated by the flash evaporation, is withdrawn from the bottom of the tank 72 by a pump 76. The pump discharges most of the liquid through the pipe 77 to the liquid inlets 100 for reuse in cooling the flue gases. A connecting pipe 80 is provided between the pipe 77 and the recirculating tank 43 so as to direct a predetermined flow of concentrated sodium sulphate fume solution, for example, at a concentration of 20% by weight, to the tank for mixing with the concentrated black liquor therein. The barometric condenser 74 is supplied with cooling water which condenses the evaporated moisture introduced therein, with the combined discharge and recovered heat content passing through a pipe 81 to a warm water sump 82, from which it is withdrawn to a point of use. With this arrangement, an equilibrium condition is established such that the amount of water flash evaporated equals the amount of moisture condensed from the flue gases in the tower 95 less such quantity of liquid as may be withdrawn through the connection 80. A water make-up supply 85 is connected to the liquid inlets 100 for starting-up and control purposes. Because of the high concentration of sodium sulphate in the liquid circulating through the tower 95, a cyclone separator 90 is desirably included in the gas outlet duct 91 from the tower to separate and return any solution carried over in the gases to the tower through a pipe 92. The fume recovery efficiency is primarily dependent upon the amount of vapor condensed in the tower 95 which in turn is dependent upon the volume and extent to which the cooling liquid is cooled before entering the tower 95, and this temperature in turn depends upon the vacuum created by the barometric condenser. Suitable valves and dampers (not shown) are incorporated in the described piping and ducts to control the fluid flow therethrough.

The chemical recovery system described will modify and greatly reduce the amount of chemicals required in the pulping process to maintain the proper concentration of solution. One example of the advantageous chemical effects of the present invention upon the operation of a sulphate paper pulp mill, is the following: If the usual sodium sulphate loss in the flue gases of an average pulp mill is 150 pounds per ton of pulp, the recovery system of the present invention will reduce this loss to approximately 8 pounds of sodium sulphate per ton of pulp, leaving a net saving of 142 pounds per ton in the amount of make-up. If this same mill is operating at 30% sulphidity and normally requires approximately 125 pounds of sodium sulphate as make-up for losses such as at the washers and in causticizing, the use of the present invention will allow the substitution of approximately 50% of the sodium sulphate by an equivalent amount of soda ash or caustic. The equivalent ratio of $Na_2O$ to sulphur in the sodium sulphate is 1 to 1 while that in the cooking liquor of the 30% sulphidity example above would be 1 to 0.3. Because of the sulphur loss heretofore common in a pulp mill without an equivalent loss of $Na_2O$, it has been necessary to add $Na_2O$ and sulphur in the ratio of 1 to 1 in order to maintain a ratio of 1 to 0.3 in the system. By the process described, the $Na_2O$ to sulphur ratio in the make-up may be adjusted to a value approximating that carried in the system. The same pulp mill requiring 275 pounds of make-up sodium sulphate per ton of pulp, would in using the present invention reduce these make-up requirements to approximately 58 pounds of sodium sulphate and approximately 42.5 pounds of sodium hydroxide per ton of pulp. In the event it is desired to carry a higher sulphidity than that normally employed, the make-up ratio may be modified accordingly. The described savings are substantial and when obtained in addition to the substantial elimination of the noxious gas and dust nuisances, of considerable commercial advantage.

While in accordance with the provisions of the statutes we have illustrated and described herein a preferred embodiment of the invention, those skilled in the art will understand that changes may be made in the method of operation and form of the apparatus disclosed without departing from the spirit of the invention covered by our claims, and that certain features of the invention may sometimes be used to advantage without a corresponding use of other features. For example, if a less efficient form of direct contact liquor evaporator be employed, resulting in a small amount of gaseous sulphur oxides being present in the gases entering the tower 95, recovery of these oxides can be effected in the tower by adding caustic or soda ash to the recycled liquid in amounts sufficient to maintain the liquid in a buffered condition.

We claim:

1. The method of recovering heat and chemicals from the residual liquor resulting from the digestion of cellulosic fibrous material in an alkaline cooking liquor which comprises concentrating the residual liquor and absorbing gaseous sulphur oxides therein by a direct intimate contact of the residual liquor with hot flue gases containing gaseous sulphur oxides and chemical fume particles, centrifugally separating residual liquor entrained in the flue gases as a result of said liquor-gas contact from the flue gases, passing the flue gases after centrifugally separating substantially all of the residual liquor therefrom through a fume recovery zone in intimate contact with a recirculated aqueous liquid, withdrawing the recovered fume from the fume recovery zone in said aqueous liquid, adding make-up water to the aqueous liquid, concentrating the aqueous liquid containing the recovered fume, mixing the concentrated aqueous liquid with the residual liquor before incineration thereof, and incinerating the concentrated residual liquor to recover inorganic chemicals therefrom and to generate hot flue gases containing gaseous sulphur oxides and a chemical fume.

2. The method of recovering heat and chemicals from the residual liquor resulting from the digestion of cellulosic fibrous material in a cooking liquor which comprises concentrating the residual liquor by multiple effect evaporation, further concentrating the partly concentrated residual liquor and absorbing gaseous sulphur oxides therein by the direct intimate contact of the partly concentrated residual liquor with hot flue gases containing gaseous sulphur oxides and a chemical fume, centrifugally separating residual liquor entrained in the flue gases as a result of said liquor-gas contact from the flue gases, passing the flue gases after centrifugally separating the residual liquor therefrom through a fume recovery zone in intimate contact with an aqueous liquid for the recovery of chemical fume from the flue gases, recirculating the aqueous liquid through said fume recovery zone, mixing the recirculated aqueous liquid with residual liquor before incineration thereof, and incinerating the further concentrated residual liquor to recover inorganic chemicals therefrom and to generate hot flue gases containing gaseous sulphur oxides and a chemical fume.

3. The method of recovering heat and chemicals from the residual liquor resulting from the digestion of cellulosic fibrous material in an alkaline sodium base cooking liquor which comprises concentrating the residual liquor by multiple effect evaporation, further concentrating the partly concentrated residual liquor and absorbing gaseous sulphur oxides therein by the direct intimate contact of the partly concentrated residual liquor with hot flue gases containing gaseous sulphur oxides and a sodium sulphate fume, centrifugally separating substantially all of the residual liquor entrained in the flue gases as a result of said liquor-gas contact from the flue gases, passing the flue gases after centrifugally separating the residual liquor therefrom through a fume recovery zone in intimate contact with an aqueous liquid for the recovery of sodium carbonate fume from the flue gases, concentrating the aqueous liquid, recirculating the concentrated aqueous liquid through said fume recovery zone, mixing the concentrated aqueous liquid with the residual liquor before incineration thereof, and incinerating the further concentrated residual liquor to recover inorganic chemicals therefrom and to generate hot flue gases containing gaseous sulphur oxides and sodium sulphate fume.

4. The method of recovering heat and chemicals from the residual liquor resulting from the digestion of cellulosic fibrous material in a sulphide-containing sodium base cooking liquor which comprises oxidizing the residual liquor without combustion in an oxidizing zone by intimate contact with air to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct spray contact of the partly concentrated oxidized residual liquor with hot flue gases containing gaseous sulphur oxides and chemical fume particles, centrifugally separating oxidized residual liquor from the flue gases, passing the flue gases after centrifugally separating the oxidized liquor therefrom through a fume recovery zone in intimate contact with an aqueous liquid for the recovery of a chemical fume from the flue gases, adding make-up water to the aqueous liquid, concentrating the aqueous liquid, and adding the concentrated aqueous liquid to the oxidized residual liquor.

5. The method of recovering heat and chemicals from the residual liquor resulting from the digestion of cellulosic fibrous material in a sulphide-containing sodium base alkaline cooking liquor which comprises oxidizing the residual liquor without combustion in an oxidizing zone by intimate contact with air to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct spray contact of the partly concentrated oxidized residual liquor with hot flue gases containing gaseous sulphur oxides and chemical fume particles, centrifugally separating oxidized residual liquor from the flue gases, passing the flue gases after centrifugally separating the oxidized residual liquor therefrom through a fume recovery zone into intimate contact with an aqueous liquid for the recovery of a chemical fume from the flue gases, concentrating the aqueous liquid, recirculating the concentrated aqueous liquid through said fume recovery zone, adding make-up water to the aqueous liquid, adding concentrated aqueous liquid to the oxidized residual liquor before the incineration thereof, and incinerating the further concentrated oxidized residual liquor to recover heat and chemicals therefrom and to produce said hot flue gases.

6. The method of recovering heat and chemicals from the residual liquor resulting from the digestion of cellulosic fibrous material in a sulphide-containing sodium base alkaline cooking liquor which comprises oxidizing the residual liquor without combustion in an oxidizing zone by intimate contact with air to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct spray contact of the partly concentrated oxidized residual liquor with hot flue gases containing gaseous sulphur oxides and sodium sulphate fume, centrifugally separating oxidized residual liquor from the flue gases, passing the flue gases and included water vapor after centrifugally separating the oxidized residual liquor therefrom through a fume recovery zone in intimate contact with an aqueous cooling liquid under heat transfer conditions sufficient to condense included vapor in the flue gases, cooling the aqueous cooling liquid and absorbed fume, adding make-up water to the aqueous liquid, adding aqueous cooling liquid and absorbed fume to the oxidized residual liquor before the incineration thereof, and incinerating the further concentrated oxidized residual liquor to recover heat and chemicals therefrom and to produce said hot flue gases.

7. The method of recovering heat and chemicals from the residual liquor resulting from the digestion of cellulosic fibrous material in a sulphide-containing sodium base alkaline cooking liquor which comprises oxidizing the residual liquor without combustion in an oxidizing zone by intimate contact with air to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct spray contact of the partly concentrated oxidized residual liquor with hot flue gases containing gaseous sulphur oxides and sodium sulphate fume, centrifugally separating oxidized residual liquor from the flue gases, passing the flue gases and included water vapor after centrifugally separating the oxidized residual liquor therefrom through a fume recovery zone in direct heat transfer contact with an aqueous cooling liquid for a period sufficient to condense a major part of the included vapor in the flue gases, cooling and concentrating the aqueous cooling liquid and absorbed fume by flash evaporation, recirculating the cooled and concentrated aqueous cooling liquid through said fume recovery zone, adding make-up water to the recirculated aqueous liquid, adding concentrated aqueous liquid to the oxidized residual liquor before the incineration thereof, and incinerating the further concentrated oxidized residual liquor to recover heat and chemicals therefrom and to produce said hot flue gases.

8. The method of recovering heat and chemicals from the residual liquor resulting from the digestion of cellulosic fibrous material in a sulphide-containing sodium base alkaline cooking liquor which comprises oxidizing the residual liquor without combustion in an oxidizing zone by intimate contact with air under predetermined temperature and pressure conditions to stabilize unstabilized sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct spray contact of the partly concentrated oxidized residual liquor with hot flue gases containing gaseous sulphur oxides and sodium sulphate fume under heat transfer conditions sufficient to reduce the gas temperature substantially below 250° F., centrifugally separating substantially all of the oxidized residual liquor from the flue gases, passing the flue gases and included water vapor after centrifugally separating the oxidized residual liquor therefrom through a fume recovery zone in intimate contact with an aqueous cooling liquid for a period sufficient to condense substantially all of the included vapor in the flue gases, cooling and concentrating the aqueous cooling liquid and absorbed fume by flash evaporation, recirculating the cooled and concentrated aqueous cooling liquid through said fume recovery zone, adding make-up water to the recirculated aqueous liquid, adding part of the cooled and concentrated aqueous liquid to the oxidized residual liquor before the incineration thereof, and incinerating the further concentrated oxidized residual liquor to recover heat and chemicals therefrom and to produce said hot flue gases.

9. The method of recovering heat and chemicals from the residual liquor resulting from the digestion of cellulosic fibrous material in a sulphide-containing sodium base alkaline cooking liquor which comprises stabilizing unstabilized sodium-sulphur compounds in the residual liquor against the evolution of noxious gases on further heating by passing the residual liquor through a non-combustive oxidizing zone in intimate contact with air, concentrating the oxidized residual liquor by multiple effect evaporation, spraying the concentrated oxidized liquor into hot flue gases resulting from the incineration of further concentrated residual liquor, passing the liquor-laden flue gases upwardly through a spray tower in intimate contact with a descending stream of further concentrated residual liquor while effecting centrifugal separation of the residual liquor in the flue gases, and controlling the flue gas temperature in the spray tower and the residual liquor evaporation by the recirculation of further concentrated liquor therein.

10. Apparatus for recovering heat and chemicals from the residual liquor resulting from the digestion of cellulosic fibrous material in a sulphide-containing alkaline sodium base cooking liquor comprising in combination, a packed tower for the low temperature oxidation of residual liquor in direct contact with an oxygen containing gas, a multiple effect evaporator for concentrating the oxidized residual liquor, a gas scrubber arranged to further concentrate the oxidized residual liquor by direct contact heat exchange with hot flue gases and to centrifugally remove entrained liquor from the gases prior to their discharge from said scrubber, a recovery furnace for incinerating the further concentrated liquor to recover heat and chemicals therefrom and to produce hot flue gases, a packed tower for cooling the flue gases leaving the gas scrubber below their saturation temperature by direct heat exchange contact with a cooling liquid, a flash tank maintained at a subatmospheric pressure for cooling and concentrating the heated cooling liquid from said packed cooling tower, and a valved conduit between said flash tank and said gas scrubber for adding a portion of the concentrated cooling liquid with included solids to the further concentrated oxidized residual liquor before the incineration thereof.

11. The method of recovering heat and chemicals from the residual liquor resulting from the digestion of cellulosic fibrous material in a sulphite-containing alkaline base cooking liquor which comprises oxidizing the residual liquor without combustion by intimate contact with an oxygen-containing gas to stabilize unstabilized sulphur compounds therein against the evolution of noxious gases on further heating, concentrating the oxidized residual liquor by a direct intimate contact of the oxidized residual liquor with hot flue gases containing chemical fume particles, passing the flue gases cooled by concentrating said liquor through a fume recovery zone in spray contact with a cooling liquid wherein the gases are further cooled below their dew point, adding make-up water to the cooling liquid, withdrawing the recovered fume from the fume recovery zone in solution, and mixing the fume solution with the residual liquor.

12. The method of recovering heat and chemicals from the residual liquor resulting from the digestion of cellulosic fibrous material in a sulphide-containing alkaline base cooking liquor which comprises oxidizing the residual liquor without combustion by intimate contact with an oxygen-containing gas in an oxidizing zone to stabilize sodium-sulphur compounds therein against the evolution of noxious gases on further heating, concentrating the oxidized residual liquor by multiple effect evaporation, further concentrating the partly concentrated oxidized residual liquor and absorbing gaseous sulphur oxides by the direct spray contact of the partly concentrated oxidized residual liquor with hot flue gases containing gaseous sulphur oxides and chemical fume particles, passing the flue gases through a fume recovery zone in intimate contact with an aqueous liquid for the recovery of a chemical fume from the flue gases, adding make-up water to the aqueous liquid, and incinerating the further concentrated oxidized residual liquor to recover heat and chemicals therefrom and to produce said hot flue gases.

13. The method of recovering heat and chemicals from the residual liquor resulting from the digestion of cellulosic fibrous material in a sulphide-containing alkaline base cooking liquor which comprises oxidizing the residual liquor without combustion by intimate contact with an oxygen-containing gas to stabilize unstabilized sulphur compounds therein against the evolution of noxious gases on further heating, concentrating the oxidized residual liquor by a direct intimate contact of the oxidized residual liquor with hot flue gases containing chemical fume particles, passing the flue gases cooled by concentrating said liquor through a fume recovery zone in spray contact with a cooling liquid wherein moisture is condensed from the gases whereby fume particles are removed from suspension in said gases, adding make-up water to the cooling liquid, withdrawing the recovered fume from the fume recovery zone in solution, and mixing the fume solution with the residual liquor.

14. The method of recovering heat and chemicals from the residual liquor resulting from the digestion of cellulosic fibrous material in a sulphide-containing alkaline base cooking liquor which comprises oxidizing the residual liquor without combustion by intimate contact with an oxygen-containing gas to stabilize unstabilized sulphur compounds therein against the evolution of noxious gases on further heating, concentrating the oxidized residual liquor by a direct intimate contact of the oxidized residual liquor with hot flue gases containing chemical fume particles, separating the residual liquor from the flue gases, passing the flue gases after separating the residual liquor therefrom through a fume recovery zone, adding make-up water to the liquid, withdrawing the recovered fume from the fume recovery zone in solution, recovering heat from the flues gases leaving the fume recovery zone in direct contact with a sprayed liquid, and mixing the fume solution with the residual liquor.

References Cited in the file of this patent

UNITED STATES PATENTS

| | | |
|---|---|---|
| 1,797,585 | Peebles | Mar. 24, 1931 |
| 1,904,170 | Richter | Apr. 18, 1933 |
| 1,933,254 | Goodell | Oct. 31, 1933 |
| 1,961,351 | Gustin | June 5, 1934 |
| 2,070,632 | Tomlinson | Feb. 16, 1937 |
| 2,161,110 | Tomlinson | June 6, 1939 |
| 2,303,811 | Badenhausen | Dec. 1, 1942 |
| 2,385,955 | Tomlinson | Oct. 2, 1945 |

UNITED STATES PATENT OFFICE

CERTIFICATE OF CORRECTION

Patent No. 2,840,454                                                        June 24, 1958

George H. Tomlinson et al.

It is hereby certified that error appears in the printed specification of the above numbered patent requiring correction and that the said Letters Patent should read as corrected below.

Column 5, line 11, before "point" insert -- dew --; column 12, line 47, before "liquor" insert -- residual --; column 16, line 25, strike out "in direct contact with a sprayed liquid" and insert the same after "zone" and before the comma in line 21, same column.

Signed and sealed this 28th day of October 1958.

(SEAL)
Attest:

KARL H. AXLINE
Attesting Officer

ROBERT C. WATSON
Commissioner of Patents